(12) United States Patent
Masuda et al.

(10) Patent No.: US 11,080,126 B2
(45) Date of Patent: Aug. 3, 2021

(54) APPARATUS AND METHOD FOR MONITORING COMPUTER SYSTEM

(71) Applicant: Hitachi, Ltd., Tokyo (JP)

(72) Inventors: Mineyoshi Masuda, Tokyo (JP); Katsunori Suzuki, Tokyo (JP); Hironori Emaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 16/095,015

(22) PCT Filed: Feb. 7, 2017

(86) PCT No.: PCT/JP2017/004327
§ 371 (c)(1),
(2) Date: Oct. 19, 2018

(87) PCT Pub. No.: WO2018/146714
PCT Pub. Date: Aug. 16, 2018

(65) Prior Publication Data
US 2019/0121687 A1   Apr. 25, 2019

(51) Int. Cl.
*G06F 11/00* (2006.01)
*G06F 11/07* (2006.01)
*G06F 11/34* (2006.01)
*G06F 11/30* (2006.01)

(52) U.S. Cl.
CPC ........ *G06F 11/079* (2013.01); *G06F 11/0709* (2013.01); *G06F 11/0751* (2013.01); *G06F 11/0787* (2013.01); *G06F 11/3447* (2013.01); *G06F 11/3452* (2013.01); *G06F 11/3006* (2013.01); *G06F 11/3495* (2013.01)

(58) Field of Classification Search
CPC .............. G06F 11/079; G06F 11/0751; G06F 11/3447; G06F 11/3452
See application file for complete search history.

(56) References Cited

U.S. PATENT DOCUMENTS

| | | | | |
|---|---|---|---|---|
| 9,355,007 | B1* | 5/2016 | Eicher | G06F 11/3428 |
| 9,471,778 | B1* | 10/2016 | Seo | H04L 63/1425 |
| 10,592,328 | B1* | 3/2020 | Thompson | G06F 11/0793 |

(Continued)

FOREIGN PATENT DOCUMENTS

JP   2009-199534 A   9/2009

*Primary Examiner* — Jonathan D Gibson
(74) *Attorney, Agent, or Firm* — Procopio, Cory, Hargreaves & Savitch LLP

(57) ABSTRACT

An apparatus for monitoring a computer system includes a data collecting unit that collects performance data on a plurality of performance items related to the performance of the computer system; a performance degradation cause model 30 in which a cause event and degradation performance items which are one or more performance items degraded by the cause event are associated with one another; and an outlier score calculator 50 that specifies a degree of deviation, when target performance data which is performance data of degradation performance items collected by the data collecting unit deviates from a normal range under a condition that the normal range of the performance data of the one or more degradation performance items for the cause event is predetermined, and outputs information on the cause event based on a temporal change in the degree of deviation.

10 Claims, 29 Drawing Sheets

(56) References Cited

U.S. PATENT DOCUMENTS

| | | | | |
|---|---|---|---|---|
| 2015/0026521 A1* | 1/2015 | Yabuki | ............... | G06F 11/0751 714/37 |
| 2015/0033086 A1* | 1/2015 | Sasturkar | ............... | G06F 16/26 714/57 |
| 2016/0055044 A1* | 2/2016 | Kawai | ............... | G06F 11/3082 714/26 |
| 2016/0217022 A1* | 7/2016 | Velipasaoglu | ...... | G06F 11/0772 |
| 2017/0046127 A1* | 2/2017 | Fletcher | ............... | H04L 41/069 |
| 2017/0147418 A1* | 5/2017 | Sasturkar | ............ | G06F 11/3452 |
| 2018/0336081 A1* | 11/2018 | Tee | .................... | H04L 43/0823 |
| 2019/0163546 A1* | 5/2019 | Ungar | ................. | G06F 11/079 |
| 2020/0057973 A1* | 2/2020 | Suzuki | ................ | G06K 9/6215 |

* cited by examiner

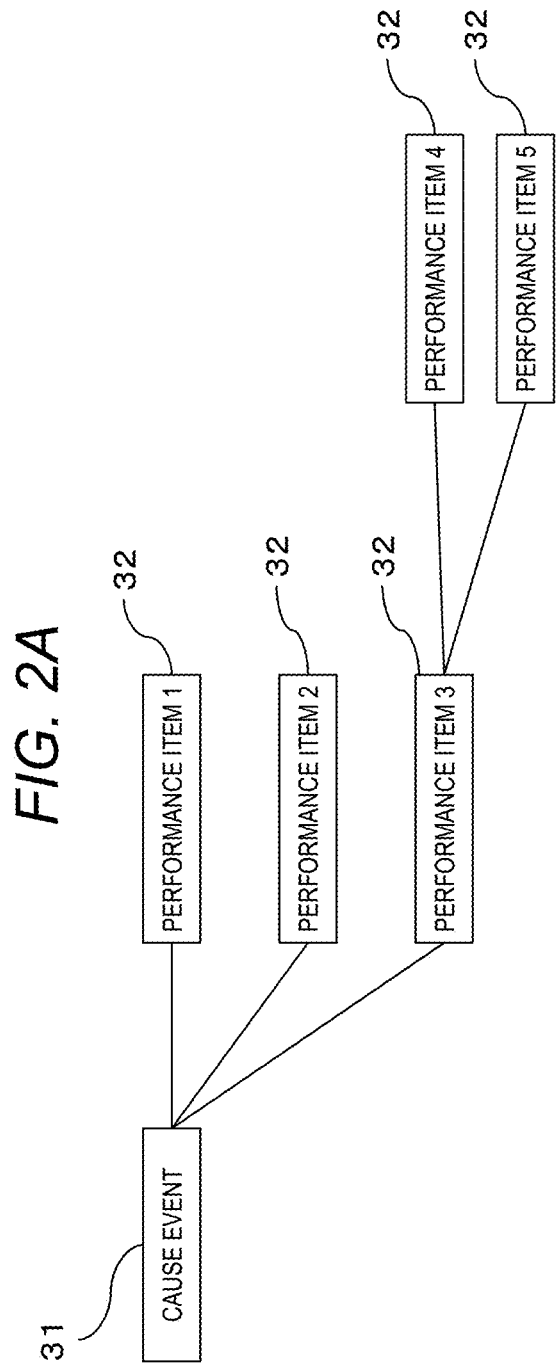

FIG. 3

| SYSTEM | PERFORMANCE ITEM | MEASUREMENT TIME | MEASUREMENT VALUE |
|---|---|---|---|
| STORAGE SYSTEM | AVERAGE Read RESPONSE TIME | t1 | 8ms |
| | PROCESSOR UTILIZATION | t1 | 10% |
| | CACHE HIT RATIO | t1 | 95% |
| | IOPS | t1 | 1000 |
| | ... | ... | ... |
| | AVERAGE RESPONSE TIME | t2 | 9ms |
| | PROCESSOR UTILIZATION | t2 | 15% |
| | CACHE HIT RATIO | t2 | 98% |
| | IOPS | t2 | 500 |
| | ... | ... | ... |

41 — SYSTEM
42 — PERFORMANCE ITEM
43 — MEASUREMENT TIME
44 — MEASUREMENT VALUE
40

FIG. 4

| SYSTEM 51 | CAUSE EVENT ID 52 | CAUSE EVENT 53 | AGGREGATE OF NUMERICAL PARAMETERS 54 |
|---|---|---|---|
| STORAGE SYSTEM | P1 | Read I/O PROCESSING DELAY DUE TO Write PROCESSING CONFLICT | (...) |
| .. | .. | .. | .. |

| SYSTEM | MEASUREMENT TIME | CAUSE EVENT ID | OUTLIER SCORE |
|---|---|---|---|
| STORAGE SYSTEM | T1 | P1 | 0 |
| | T1 | P2 | 0 |
| | T1 | P3 | 10 |
| | ⋮ | ⋮ | ⋮ |
| | T2 | P1 | 0 |
| | T2 | P2 | 3 |
| | T2 | P3 | 0 |
| | ⋮ | ⋮ | ⋮ |
| | T1 | P4 | 0 |

61 — SYSTEM
62 — MEASUREMENT TIME
63 — CAUSE EVENT ID
64 — OUTLIER SCORE
60

FIG. 6

| SYSTEM | PERIOD ID | CAUSE EVENT ID | OUTLIER SCORE STATISTICAL VALUE |
|---|---|---|---|
| STORAGE SYSTEM | W1 | P1 | AVERAGE 21, STANDARD DEVIATION 3 |
| | | P2 | AVERAGE 12, STANDARD DEVIATION 5 |
| | | P3 | AVERAGE 3, STANDARD DEVIATION 2 |
| | ⋮ | ⋮ | ⋮ |
| | W1 | P4 | AVERAGE 7, STANDARD DEVIATION 5 |
| | ⋮ | ⋮ | ⋮ |

FIG. 7

| SYSTEM 81 | BATCH TYPE 85 | EXECUTION PERIOD 86 | CAUSE EVENT ID 83 | OUTLIER SCORE STATISTICAL VALUE 84 |
|---|---|---|---|---|
| STORAGE SYSTEM | BATCH 1 | T1 TO T2 | P1 | AVERAGE 21, STANDARD DEVIATION 3 |
| | | | P2 | AVERAGE 12, STANDARD DEVIATION 5 |
| | ⋮ | | ⋮ | ⋮ |
| | BATCH 2 | T3 TO T4 | P1 | AVERAGE 7, STANDARD DEVIATION 5 |
| | | | P2 | AVERAGE 2, STANDARD DEVIATION 3 |
| | | | ⋮ | ⋮ |

| SYSTEM | KPI | MEASUREMENT TIME | PATTERN ID | PATTERN SCORE |
|---|---|---|---|---|
| STORAGE SYSTEM | AVERAGE Read RESPONSE TIME | t1 | P1 | 0 |
| | | t1 | P2 | 0 |
| | | t1 | P3 | 10 |
| | | : | : | : |
| | | t2 | P1 | 0 |
| | | t2 | P2 | 3 |
| | | t2 | P3 | 0 |
| | AVERAGE Write RESPONSE TIME | t1 | P4 | 0 |
| | | : | : | : |

FIG. 16

| SYSTEM | KPI | PATTERN ID | FEATURE PERFORMANCE ITEM | LABEL |
|---|---|---|---|---|
| STORAGE SYSTEM | AVERAGE Read RESPONSE TIME | P1 | IOPS, Read CACHE HIT RATIO | No Data |
| | | P2 | CACHE HIT RATIO, CACHE SIZE | Write PROCESSING CONFLICT |
| | | P3 | LOW IOPS, HIGH CACHE HIT RATIO | NORMAL |
| | AVERAGE Write RESPONSE TIME | P4 | LOW IOPS, COPY PROCESSING | SYSTEM PROCESSING CONFLICT |
| | ⋮ | ⋮ | ⋮ | ⋮ |

271  272  273  274  275

270

APPARATUS AND METHOD FOR MONITORING COMPUTER SYSTEM

TECHNICAL FIELD

The present invention relates to a technique for measuring a performance of a computer system and supporting a cause analysis of performance degradation.

BACKGROUND ART

When the performance of the computer system degrades, it prevents comfortable use of the computer system's user, and the satisfaction degree of the user decreases. Therefore, the apparatus for monitoring the computer system analyzes the performance data collected from the computer system, and specifies the occurrence time of the performance degradation and the cause of degradation (a component of the computer system having degraded performance). The administrator of the computer system executes measures for restoring the performance of the computer system based on the analysis result of the monitoring apparatus.

There are known various methods of detecting the performance degradation. For example, PTL 1 describes a method of discovering performance items correlated with one another by learning performance data collected from a computer system. According to this method, every time the performance data of a plurality of performance items are collected, the monitoring apparatus computes the correlation between the performance items and detects the loss of the correlation existing at the normal time, thereby detecting the performance degradation.

CITATION LIST

Patent Literature

PTL 1: JP-A-2009-199534

SUMMARY OF INVENTION

Technical Problem

By the way, it is relatively easy to detect the performance degradation when the performance is obviously degraded in the computer system, while it is not easy to detect the performance degradation when the performance is not always obviously degraded, but gradually degraded. Generally, it is performed to determine the presence or absence of the performance degradation using a threshold value, but there are many erroneous determinations for various reasons.

Even if the degradation of performance is detected, it is often not possible to immediately specify a cause event from the measured performance data.

Solution to Problem

According to one aspect of the present invention, there is provided a monitoring apparatus for monitoring a computer system, in which when the performance data related to the performance item deviates from a normal range under a condition that the normal range of the performance data of a performance item related to the cause event is predetermined, a degree of deviation is specified and information on the cause event is output based on a temporal change in the degree of deviation.

According to another aspect of the present invention, there is provided a monitoring apparatus for monitoring a computer system, in which when a plurality of performance data groups are obtained by grouping the performance data of a plurality of performance items related to an evaluation index of the computer system, a similarity between performance data related to a performance item and a performance data group is determined, and a label of the most similar performance data group is output.

BRIEF DESCRIPTION OF DRAWINGS

FIG. 2A is an explanatory diagram of a performance degradation cause model 30.

FIG. 3 is an explanatory diagram of a performance data table 40.

FIG. 4 is an explanatory diagram of an outlier score calculator 50.

FIG. 5 is an explanatory diagram of an outlier score history table 60.

FIG. 6 is an explanatory diagram of an outlier score aggregation table 70.

FIG. 7 is an explanatory diagram of a batch outlier score aggregation table 80.

FIG. 15 is an explanatory diagram of a pattern score table 260.

FIG. 16 is an explanatory diagram of a performance degradation pattern table 270.

DESCRIPTION OF EMBODIMENTS

Figure 1A:
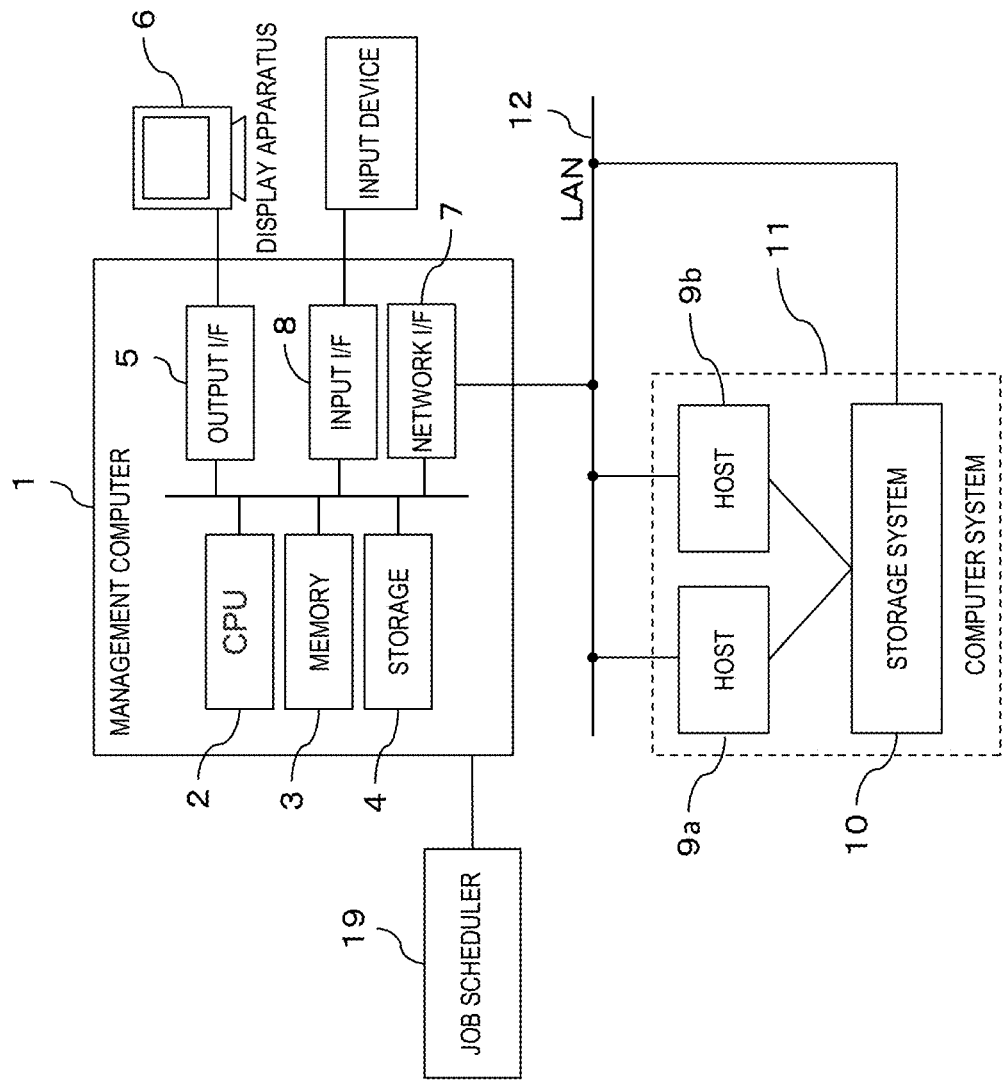
FIG. 1A is a hardware configuration diagram of a performance monitoring system according to first and second embodiments.

A performance analysis system according to one embodiment of the present invention includes a management computer 1 which is a monitoring apparatus for monitoring a computer system. The management computer 1 includes a data collecting unit that collects performance data on a plurality of performance items related to the performance of the computer system and a performance degradation cause model in which a cause event and degradation performance items which are one or more performance items degraded by the cause event are associated with one another. Further, the management computer 1 includes a degree-of-deviation specifying unit that specifies a degree of deviation, when a normal range of the performance data of one or more degradation performance items for a cause event is predetermined and target performance data which is the performance data of degradation performance items deviates from the normal range, and an output unit that outputs information on the cause event based on a temporal change in the degree of deviation.

The management computer 1 may further have a job execution history including a type of a job executed by the computer system and an execution period of the job. The degree-of-deviation specifying unit may specify a degree of deviation for each type of jobs and each execution period of jobs based on the job execution history and target performance data.

The management computer 1 may include a plurality of types of performance degradation cause models related to a plurality of cause events. The degree-of-deviation specifying unit may specify a degree of deviation for each of a plurality of cause events for each type of jobs and each execution period of the jobs. The management computer 1 may further include an analyzing unit that specifies a cause event related to a temporal change that most closely matches a change in the length of a required time, which is the time required for executing each job, out of temporal changes in the degree of deviation for each of a plurality of cause events. The output unit may output information indicating a cause event specified by the analyzing unit.

The management computer 1 may further include a normal range specifying unit that specifies a normal range of the performance data of one or more degradation performance items for a cause event, based on past performance data of one or more degradation performance items, obtained when the cause event does not occur.

A performance analysis system according to still another embodiment of the present invention includes a management computer 1 for monitoring a computer system. The management computer 1 includes a data collecting unit that collects performance data on a plurality of performance items related to the performance of the computer system, and an evaluation index model in which an evaluation index of the computer system and the related performance items which are a plurality of performance items related to the evaluation index are associated with one another. The management computer 1 further includes a similarity determining unit that determines a similarity between a plurality of performance data groups obtained by grouping performance data of the plurality of related performance items, obtained when the evaluation index is degraded, and target performance data which is performance data of related performance items collected by the data collecting unit. The management computer 1 outputs a performance data group most similar to the target performance data and a label indicating the feature of the performance data group.

The management computer 1 may output the information indicating the degree of contribution to degradation of an evaluation index of each related performance item, based on performance data of a plurality of related performance items contributing to degradation of the evaluation index.

The information indicating a degree of contribution to degradation is, for example, a one-dimensional graph in which each degree of contribution of each related performance item is indicated by a length.

The one-dimensional graph may include a degree of contribution to degradation of a related performance item in which a degree of contribution to degradation is larger than a predetermined value.

When target performance data is not similar to any of a plurality of performance data groups, the management computer 1 may generate new performance data group, based on performance data of the plurality of related performance items contributing to degradation of the evaluation index. Further, the management computer 1 may output information indicating a degree of contribution to degradation of an evaluation index of each related performance item, and may accept input of information related to a label to be assigned to new performance data group to which target performance data belongs.

The management computer 1 may further include a group generating unit that generates a plurality of performance data groups obtained by grouping past performance data of one or more related performance items based on the features included in the performance data, obtained when the evaluation index is degraded. The group generating unit may assign a label based on a feature of each performance data group to the generated performance data group.

Hereinafter, a performance analysis system according to an embodiment of the present invention will be described with reference to the drawings.

FIG. 1A is a hardware configuration diagram of a performance analysis system according to a first embodiment of the present invention.

As shown in the figure, the performance analysis system includes a management computer 1. The management computer 1 includes a CPU 2, a memory 3, a storage 4, an output I/F 5, a network I/F 7, and an input I/F 8. The management computer 1 reads and executes a program stored in the storage 4 to the CPU 2. Various data and the like required for executing the program are stored in the memory 3. The management computer 1 causes the display apparatus 6 to display interface screens such as performance monitoring and performance analysis results to be described later through the output I/F 5. In addition to the display apparatus 6, the management computer 1 may include output means such as transmission of e-mail, audio output, and the like. The management computer 1 communicates with the hosts (9a to 9c) or the storage 10, which are computers to be managed through the network I/F 7, and collects the performance data. The management computer 1 receives information input by an input device such as a mouse and a keyboard from an administrator through the input I/F 8, and transmits it to the CPU 2.

Figure 1B:
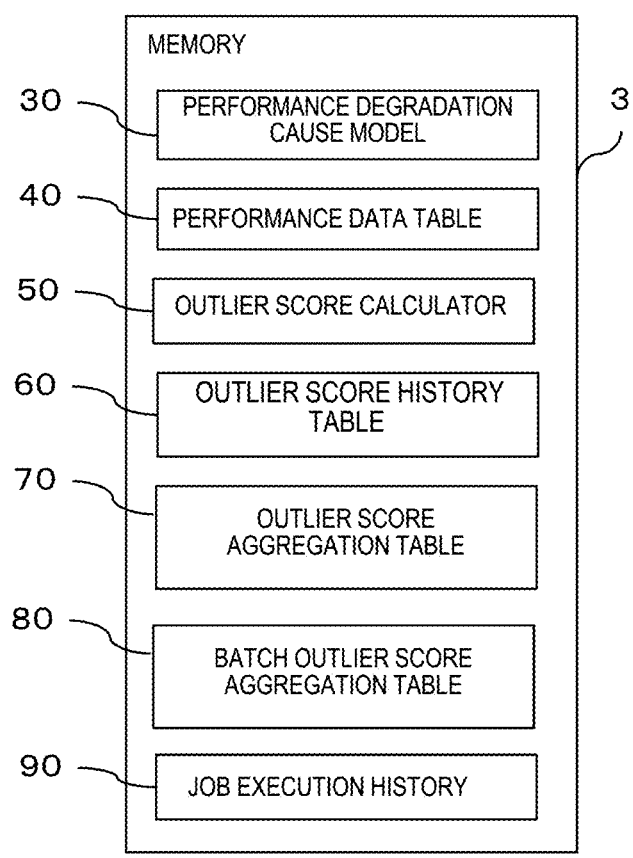
FIG. 1B is a diagram showing data stored in a memory 3 of the first embodiment.
Figure 1C:
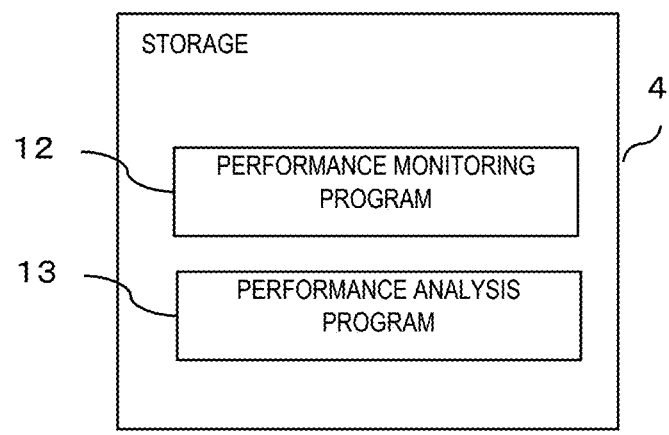
FIG. 1C is a diagram showing data stored in a storage 4 of the first embodiment.

FIGS. 1B and 1C show data stored in the memory 3 and the storage 4 of the management computer 1 according to the first embodiment of the present invention.

As shown in FIG. 1C, in the present embodiment, the storage 4 stores a performance monitoring program 12 and a performance analysis program 13.

The performance monitoring program 12 is executed by the CPU 2 to operate as a data collecting unit. The performance monitoring program 12 periodically or irregularly collects measurement values related to a plurality of performance items as performance data from a host 9 and a storage system 10 to be monitored, and stores the collected data in the performance data table 40.

The performance analysis program 13 is executed by the CPU 2 to operate as a normal range specifying unit which specifies a normal range of the performance data to generate an outlier score calculator 50, a degree-of-deviation specifying unit that calculates an outlier score related to a degree of deviation from the normal range using the outlier score calculator 50, and an analyzing unit that analyzes a temporal change in the outlier score to specify a cause event.

The performance analysis program 13 generates an outlier score calculator 50 that calculates an outlier score indicating a degree of deviation from the normal range based on the performance data at the normal time. The performance analysis program. 13 calculates an outlier score using the outlier score calculator 50. Further, the performance analysis program 13 statistically processes outlier scores calculated by the outlier score calculator 50, and analyzes the performance degradation tendency of a system to be monitored.

As shown in FIG. 1B, in the present embodiment, the memory 3 stores a performance degradation cause model 30, a performance data table 40, an outlier score calculator 50, an outlier score history table 60, an outlier score aggregation table 70, a batch outlier score aggregation table 80 and a job execution history 90.

The performance degradation cause model 30 is a causal relationship model in which a cause event 31 causing performance degradation is associated with a performance item 32 that is degraded by the cause event 31.

FIG. 2A shows an example of the configuration of the performance degradation cause model 30. In the performance degradation cause model 30, one cause event 31 may be associated with a plurality of performance items 32. The association of the performance item 32 may have a hierarchical structure as shown in the figure.

Figure 2B:
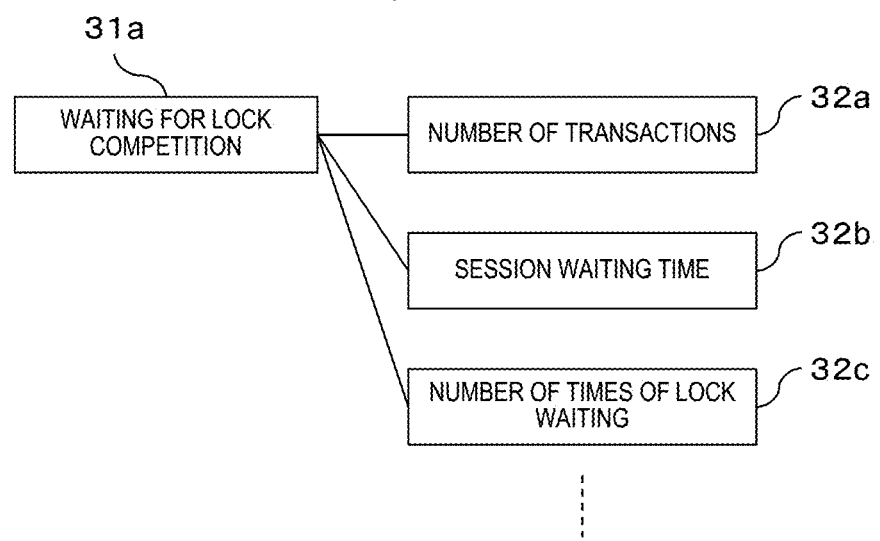
FIG. 2B is a diagram showing a specific example of the performance degradation cause model 30.
Figure 2C:
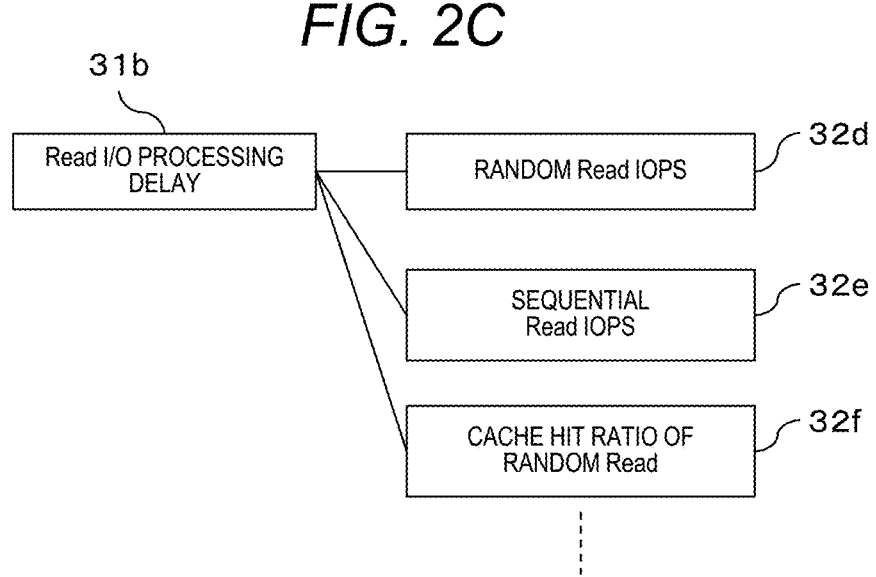
FIG. 2C is a diagram showing a specific example of the performance degradation cause model 30.

FIGS. 2B and 2C show specific examples of the performance degradation cause model 30. In FIG. 2B, a cause event 31a called "waiting for lock competition" of a performance failure of database and the performance items 32a to 32c called "the number of transactions", "session waiting time", and "the number of times of lock waiting" that are degraded by the cause event are associated with one another. In FIG. 2C, a cause event 31b called "Read I/O processing delay" of a performance failure of storage and performance items 32d to 32f called "random Read IOPS", "Sequential Read IOPS" and "a cache hit ratio of random. Read" that are degraded by the cause event are corresponded with one another.

The performance data table 40 includes performance data collected from the host 9 or the storage system 10 of the computer system to be monitored.

FIG. 3 shows an example of the performance data table 40.

The performance data table 40 includes, as data items, a system 41 indicating the name of the system to be monitored, a performance item 42, a measurement time 43 indicating a time when a measurement value 44 was measured, and the measurement value 44. In the performance data table 40, data is appropriately stored by the performance monitoring program 12.

Outlier score related to the degree of deviation from the normal range of the performance data of the corresponding performance item 32 is specified for each cause event 31 defined in the performance degradation cause model 30 in the outlier score calculation processing based on the outlier score calculator 50. The outlier score calculator 50 may be a learned model generated by machine learning, and may be, for example, a regression model generated by regression analysis. Herein, the outlier score calculator 50 may be an aggregate of several numerical parameters. Depending on the type of regression algorithm used for generating outlier score calculator 50, the contents of numerical parameters are different.

FIG. 4 shows an example of the outlier score calculator 50.

As shown in the figure, the outlier score calculator 50 includes, as data items, a system 51 indicating the name of the system to be monitored, a cause event ID 52 which is identification information of a cause event, a cause event 53, and an aggregate of numerical parameters 54. That is, the outlier score calculator 50 includes an aggregate of numerical parameters 54 for each of the system 51 and the cause event ID 52.

The outlier score history table 60 includes an outlier score calculated by the outlier score calculator 50.

FIG. 5 shows an example of the outlier score history table 60.

As shown in the figure, the outlier score history table 60 includes, as data items, a system 61, a measurement time 62, a cause event ID 63, and an outlier score 64. The outlier score 64 is a score calculated by outlier score calculation processing to be described later.

The outlier score aggregation table 70 includes a statistical value obtained by aggregating outlier scores, and the like.

FIG. 6 shows an example of the outlier score aggregation table 70.

As shown in the figure, the outlier score aggregation table 70 includes, as data items, a system 71, a period ID 72 which is identification information of a period for which aggregation is performed, a cause event ID 73, and an outlier score statistical value 74.

The outlier score statistical value 74 is a value obtained by statistically processing outlier scores for each system 71, the period ID 72, and the cause event ID 73. The outlier score statistical value 74 is, for example, a value calculated based on the data of the outlier score history table 60. In this figure, the outlier score statistical value 74 is an average value and standard deviation of the outlier score 64, the measurement time 62 of which is within a period indicated in the period ID 72.

FIG. 7 shows an example of the batch outlier score aggregation table 80.

The batch outlier score aggregation table 80 is a table that stores an outlier score related to batch processing, and is a modification of the outlier score aggregation table 70.

As shown in the figure, the batch outlier score aggregation table 80 includes, as data items, a system 81, a batch type 85, an execution period 86, a cause event ID 83, and an outlier score statistical value 84. The execution period 86 indicates the start time and end time of a batch job indicated by the batch type 85. That is, the batch outlier score aggregation table 80 includes an outlier score statistical value 84 calculated for each batch type 85, execution period 86, and cause event ID 83.

The job execution history 90 includes the type of the job executed by the computer system, start time and end time, and the like. The job execution history 90 is acquired from a job scheduler 19.

Figure 8:
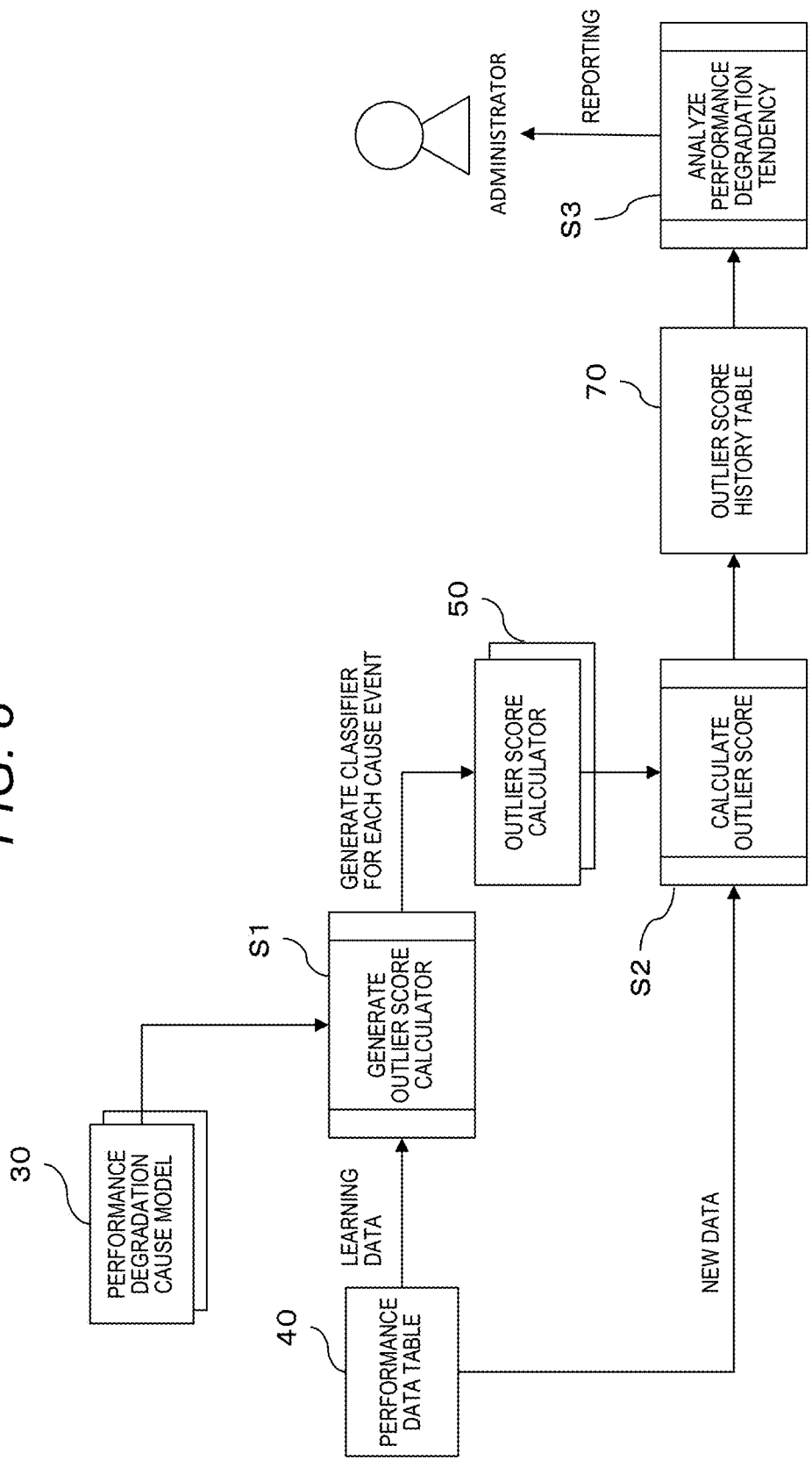
FIG. 8 is a flowchart of the processing outline of the first embodiment.

FIG. 8 shows an outline of the flow of processing performed by the performance analysis program 13. This figure shows the relationship between main processing steps S1 to S3 and their input/output data. Hereinafter, the operation of each step will be described.

First, the performance analysis program 13 generates the outlier score calculator 50 based on the performance degradation cause model 30 and the performance data at the normal time stored in the performance data table 40 (S1). For example, the performance analysis program 13 may generate an outlier score calculator 50 for each outlier cause event by a machine learning technique, according to the performance degradation cause model 30 defined for each cause event of performance degradation.

Next, the performance analysis program 13 calculates an outlier score of performance data to be analyzed, using the outlier score calculator 50 generated in step S1 (S2). For example, the performance analysis program 13 computes each outlier score for each cause event 31, according to the performance degradation cause model 30. The outlier score generated by the outlier score calculator 50 is stored in the outlier score history table 60.

Here, the outlier score may be a score indicating a probability that performance degradation occurs. The outlier score indicates a degree of deviation on how far it deviates from normal.

The performance analysis program 13 analyzes the performance degradation tendency based on data stored in the outlier score history table 60 (S3). For example, the performance analysis program 13 statistically processes outlier scores for a certain period and analyzes a change tendency (temporal change) of the outlier scores. When a tendency change is detected, the performance analysis program 13 may report the fact to an administrator.

Next, respective details of steps S1 to S3 as described above will be described.

Figure 9:
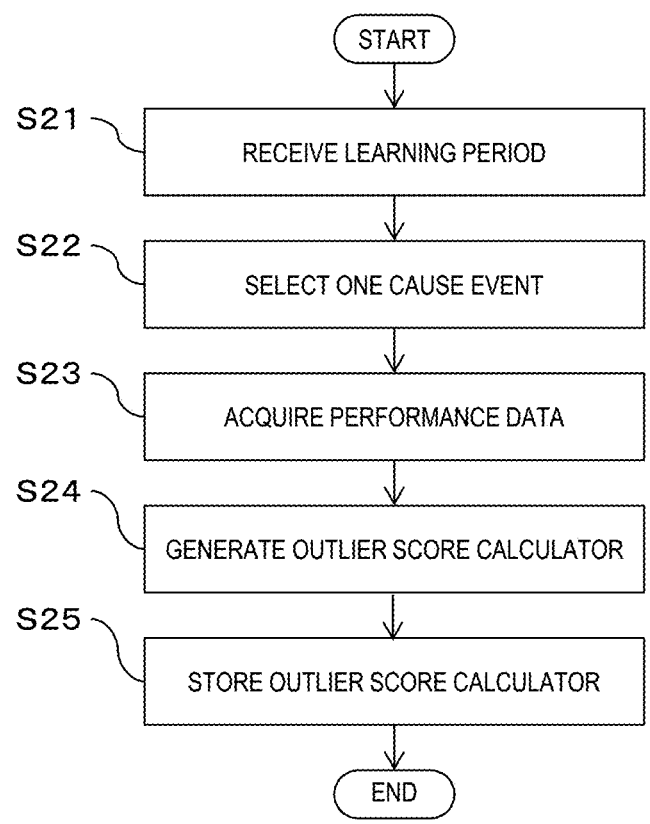
FIG. 9 is a flowchart of the generation processing of the outlier score calculator.

FIG. 9 shows detailed processing procedures of the generation processing of the outlier score calculator in step S1.

As a learning period, the performance analysis program 13 receives designation of a period in which the system to be monitored indicates a normal behavior (S21). For example, the administrator may make a designation using an input device. This period may be a period during which at least target cause event has not occurred.

The performance analysis program 13 selects one cause event 31 from the performance degradation cause model 30 (S22).

The performance analysis program 13 refers to the performance degradation cause model 30 corresponding to the selected cause event 31 and specifies a type of a performance item 32 related to the cause event 31. Further, the performance analysis program 13 acquires, from a performance data table 40, a measurement value 44 of a performance item 42 specified for the learning period designated in step S21 (S23).

The performance analysis program 13 generates an outlier score calculator 50 by machine learning based on the measurement value 44 acquired in step S23 (S24). Various generating algorithms of the outlier score calculator 50 may be adopted. For example, a generating algorithm may be regression analysis, clustering, neural networking, and the like, or a combination thereof.

For example, there will be described a case where regression analysis is adopted as the generating algorithm of the outlier score calculator 50. The performance analysis program 13 selects one of the performance items 32 related to the cause event 31 (for example, the performance item 1). Next, the performance analysis program 13 generates a regression model indicating the relationship between the performance item 1 and another performance item 32 (performance item 2) by regression analysis. The algorithm used for the regression analysis is not particularly limited thereto. Simple linear regression analysis or aggregation learning such as Support Vector Machine, neural networking, Random Forest may be used. In the outlier score calculator 50, a predicted value of the performance item 1 with respect to the performance item 2 is obtained. Therefore, according to the outlier score calculator 50, a deviation between the predicted value and the measured value of the performance item 1 may be used as an outlier score.

The performance analysis program 13 stores the outlier score calculator 50 generated in step S24, in the storage 4 (S25).

In a case where the outlier score calculator 50 for a plurality of cause events 31 is generated, the performance analysis program 13 may repeatedly perform the processing with respect to each cause event 31.

Figure 10:
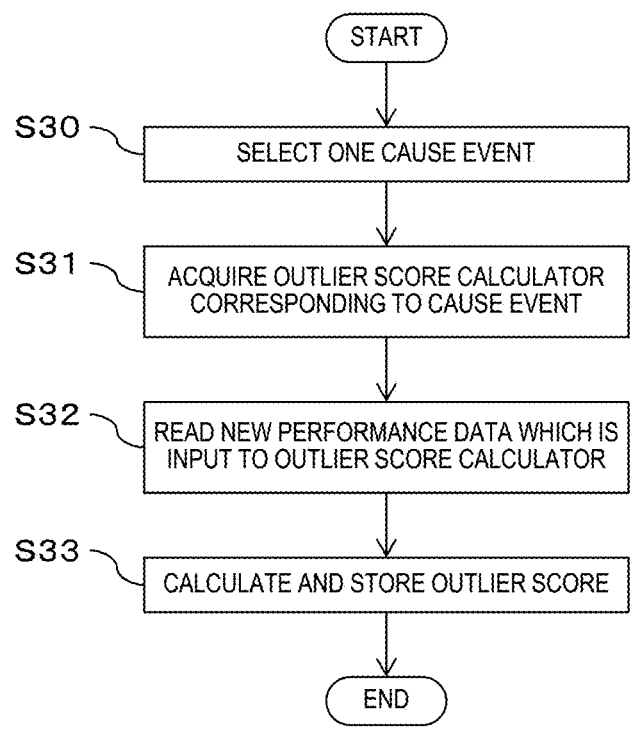
FIG. 10 is a flowchart of outlier score calculation processing.

FIG. 10 shows detailed processing procedures of the outlier score calculation processing in step S2.

In step S2, the outlier score of analysis target data is calculated using the outlier score calculator 50 generated in step S1. Here, it means that, as the outlier score becomes larger, there is a higher probability that the target cause event occurs. The performance analysis program 13 may periodically execute step S2. The performance analysis program 13 may calculate the outlier score using new data accumulated after the previous execution time as a target. Hereinafter, each step will be described.

The performance analysis program 13 selects one of a plurality of cause events 31 of the system to be monitored (S30). The performance analysis program 13 further acquires the performance degradation cause model 30 corresponding to the selected cause event 31.

The performance analysis program 13 selects the outlier score calculator 50 corresponding to the cause event 31 selected in step S30 (S31).

The performance analysis program 13 acquires performance data of the target from the performance data table 40 (S32). Here, the data acquired from the performance data table 40 may be, for example, the measurement value 44, the measurement time 43 of which is within a period to be analyzed, out of the performance item 42 of the performance degradation cause model 30 acquired in step S30.

The performance analysis program 13 inputs the performance data acquired in step S32 to the outlier score calculator 50 acquired in step S31. The outlier score calculator 50 calculates outlier score based on the input data and stores the outlier score in the outlier score history table 60 (S33).

For example, the outlier score calculator 50 generated using the regression analysis as described above, may calculate a predicted value of the performance item 1 with respect to the performance item 2 to be analyzed, and may use a difference between the measured value of the performance item 1 and the calculated predicted value as the outlier score.

Figure 11:
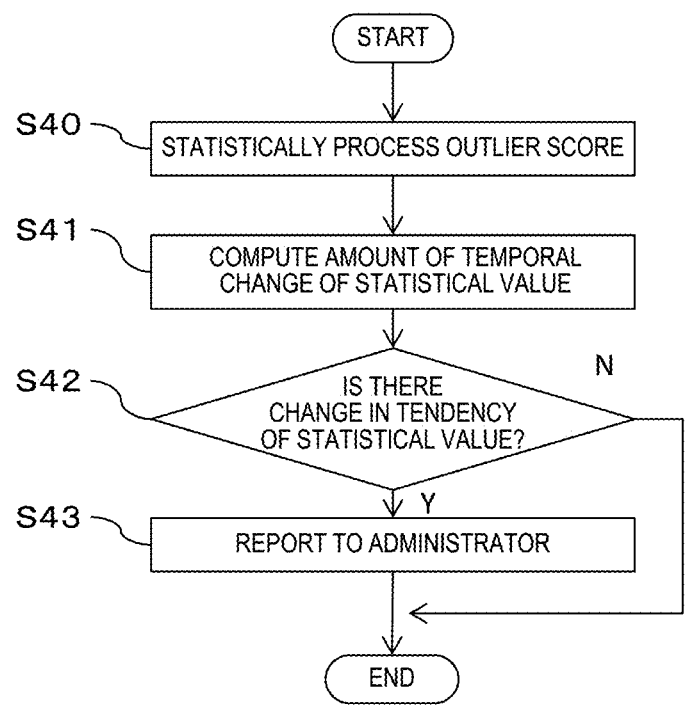
FIG. 11 is a flowchart of the analysis processing of a performance degradation tendency.

FIG. 11 shows detailed processing procedures of the analysis processing of the performance degradation tendency in step S3.

In step S3, the tendency of a temporal change of the outlier score calculated in step S2 is analyzed to detect signs of performance degradation. Hereinafter, each step will be described.

The performance analysis program 13 reads outlier scores 64 stored in the outlier score history table 60 and statistically processes the outlier scores (S40). For example, the performance analysis program 13 may group the outlier score 64 for each system 61 and cause event ID 63, and may statistically process the outlier score for each certain period (for example, one day or one week) based on the measurement time 62. The statistical processing may be, for example, processing of obtaining average value, standard deviation, variance, median, maximum value, minimum value, the most frequent value, and the like. Here, the statistical value of the calculated outlier score is stored in the outlier score aggregation table 70.

The performance analysis program 13 computes an amount of the temporal change of the statistical value 74 of the outlier score calculated in step S40 (S41). The amount of the temporal change may be, for example, a difference value between adjacent periods of statistical values calculated for each certain period.

The performance analysis program 13 determines a presence or absence of a tendency change based on the amount of the temporal change of the statistical value of the outlier score obtained in step S41 (S42). The determination of the presence or absence of a tendency change may be performed, for example, based on whether or not the amount of the temporal change exceeds a predetermined threshold value.

When no tendency change is recognized, the processing skips step S43 and is ended.

When a tendency change is recognized, the performance analysis program 13 reports a cause event and the period, in which the tendency change is recognized, to the administrator by means of e-mail, screen display or the like (S43).

As a result, it is possible to detect the occurrence of a cause event or signs of the cause event as soon as possible. The administrator who receives this report may take actions for resolving or preventing the cause event before the performance of the system degrades drastically.

As a method for detecting a tendency change, in addition to the above methods, many other methods have been studied, and these methods may be used. For example, further average value and standard deviation and the like of the outlier score statistical value 74 for each period may be obtained, further outlier in these may be detected and a tendency change may be detected. Alternatively, a regression model of the outlier score statistical value 74 may be generated using the machine learning technique, and the tendency change may be detected based on a magnitude of the deviation between the predicted value and the measured value by regression. Further, the outlier score statistical value 74 may be predicted based on the ARIMA model or the like, and a magnitude of the difference from the measured value may be compared with a predetermined threshold value to determine the tendency change.

Next, an analysis of performance degradation tendency, obtained when a batch job is executed will be described.

The aim of the batch job is to use the resources of the system as much as possible to complete specific processing in a short period. Therefore, in general, the contents of processing (workload) greatly differ depending on the type of the batch job. Therefore, in association with the batch job, the analysis processing of the performance degradation tendency in step S3 may be performed as follows.

Figure 12:
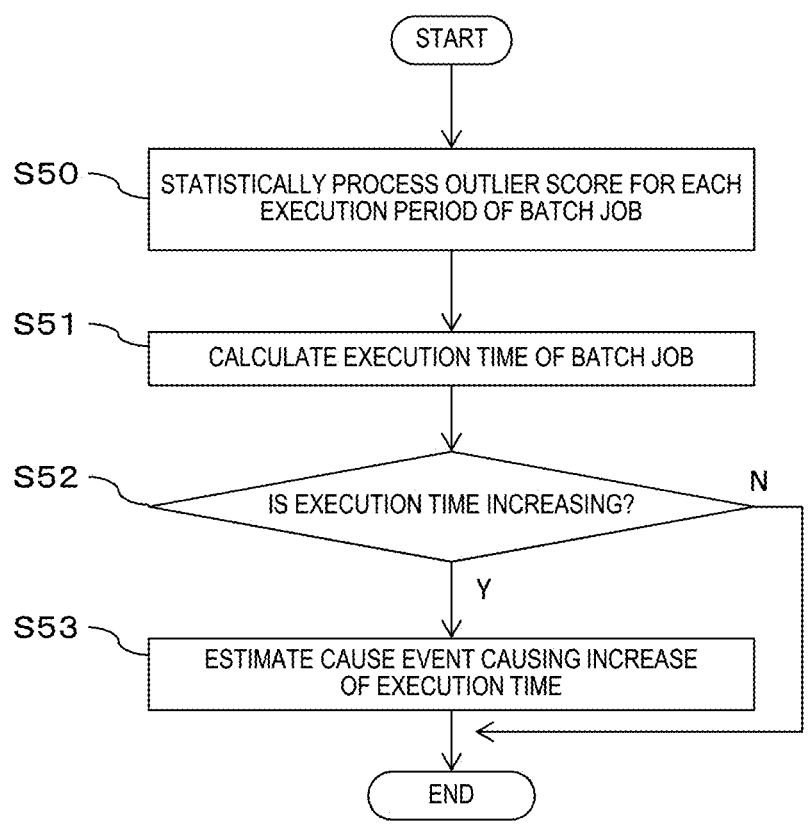
FIG. 12 is a flowchart of the analysis processing of the performance degradation tendency of a batch job.

FIG. 12 shows procedures of the analysis processing of the performance degradation tendency of the batch job performed in step S3.

The performance analysis program 13 statistically processes outlier scores for each execution period of the batch job (S50). For example, the performance analysis program 13 specifies an execution period (from the start time to the end time) for each job type within a certain period (for example, several days to one month) based on the information acquired from the job scheduler 19. The performance analysis program 13 refers to the outlier score history table 60, and statistically processes outlier scores 64, the measurement times 62 of which are within the execution period of this batch job. The performance analysis program 13 stores the results of the statistical processing in the batch outlier score aggregation table 80.

The performance analysis program 13 further calculates an execution time of each batch job, that is, a required time required for executing the batch job from the start time to the end time of the execution period 86 (S51).

The performance analysis program 13 analyzes the tendency change in the execution time of the batch job within a certain period for each type of batch job and determines whether or not the execution time is increasing (S52). As a method of determining whether or not the execution time of the batch job is increasing, for example, the execution times of the batch jobs are arranged in chronological order, and determination is performed based on whether or not the coefficient of the time term in the linear regression equation is larger than a predetermined threshold value.

When the execution time of the batch job is not increasing, the processing skips step S53 and is ended.

When the execution time of the batch job is increasing, the performance analysis program 13 estimates the cause event causing the increase (S53). For example, the performance analysis program 13 may estimate the cause event by matching the batch job execution time and the outlier score statistical value 84. The performance analysis program 13 refers to, for example, the batch outlier score aggregation table 80 and may calculate a correlation coefficient between the execution time of the batch job within a certain period and the outlier score statistical value 84 for each cause event ID 83. Then, the performance analysis program 13 may estimate the cause event ID 83 having the highest correlation coefficient as the cause event of an increase in the execution time of the batch job. The performance analysis program 13 may report this cause event to the administrator.

As a result, it is possible to estimate the cause event of the performance degradation during the execution of the batch job.

The performance analysis using the performance degradation cause model 30 has been described above.

Next, a performance analysis system according to a second embodiment of the present invention will be described. In the following description of the second embodiment, functions and configurations common to those of the first embodiment are denoted by the same reference numerals, and descriptions thereof will not be repeated in some cases.

The performance analysis system according to the present embodiment analyzes the degradation cause of the evaluation index of the computer system based on the performance data. In the present embodiment, it is possible to accumulate know-how for specifying the cause of performance degradation with minimum exchange with the administrator.

The hardware configuration of the performance analysis system according to the present embodiment is the same as that of the first embodiment.

The management computer 1 according to the present embodiment performs machine learning with performance data at the point when a Key Performance Indicator (KPI), which is an evaluation index of the computer system, is degraded, thereby generating a pattern of a plurality of performance data having different features. Then, when the analysis target data matches the known pattern, a label featuring the pattern is reported to the administrator. As a result, it is possible to estimate the cause event that occurred within the time span when the analysis target data was detected. When the management computer 1 detects a pattern of unknown performance data having a feature different from the known pattern, the management computer 1 reports the fact to the administrator. The administrator may assign a label featuring the pattern based on the feature indicated by the pattern. The label may be, for example, a cause event of performance degradation. The management computer 1 records patterns and labels in association with one another, and monitors increases in similar patterns and the like.

Figure 13A:
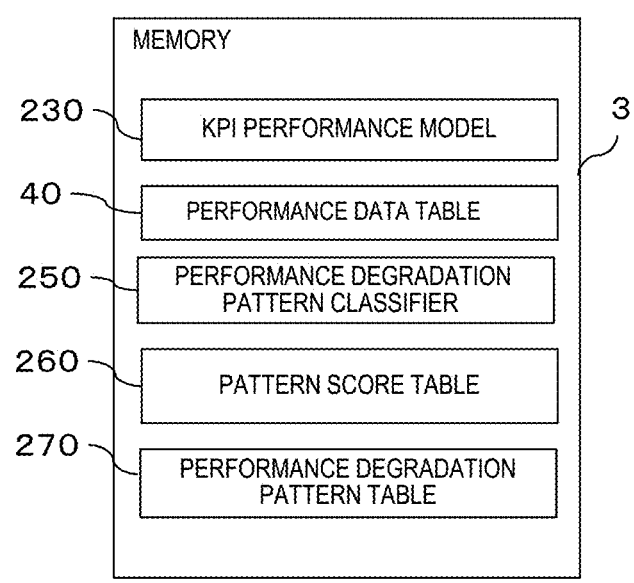
FIG. 13A is a diagram showing data stored in the memory 3 of the second embodiment.
Figure 13B:
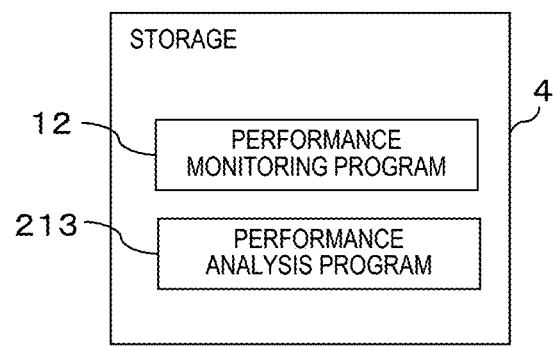
FIG. 13B is a diagram showing data stored in the storage 4 of the second embodiment.

FIGS. 13A and 13B show data stored in a memory 3 and a storage 4 of the management computer 1 according to the second embodiment of the present invention.

As shown in FIG. 13B, in the present embodiment, a performance monitoring program 12 and a performance analysis program 213 are stored in the storage 4.

A performance analysis program 213 is executed in CPU 2 to operate as a group generating unit that generates a performance degradation pattern classifier 250 for determining the degradation pattern of the KPI obtained by grouping based on the feature included in the performance data, a similarity determining unit that determines a similarity between the performance data of the analysis target and the degradation pattern of the KPI using the performance degradation pattern classifier 250, and an output unit that outputs information indicating the degree of contribution to the degradation for each performance item, obtained when the KPI is degraded.

The performance analysis program 213 generates a performance degradation pattern classifier 250 that classifies the performance data into groups according to the features of the performance data based on the performance data, obtained when the KPI has degraded. The performance analysis program 213 uses the performance degradation pattern classifier 250 to determine a similarity between the performance data to be analyzed and the performance degradation pattern. Further, the performance analysis program 213 indicates determination results of the performance degradation pattern classifier 250 on the display apparatus 6.

As shown in FIG. 13A, in the present embodiment, the memory 3 stores a KPI performance model 230, a performance data table 40, the performance degradation pattern classifier 250, a pattern score table 260 and a performance degradation pattern table 270.

In the KPI performance model 230, a KPI 231, which is an evaluation index of the computer system, and a plurality of performance items 232 which may contribute to degradation of the KPI 231 are associated with one another.

Figure 14A:
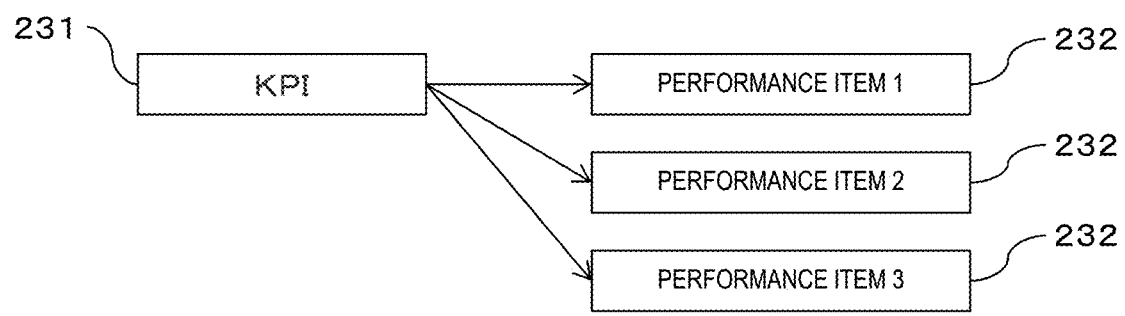
FIG. 14A is an explanatory diagram of a KPI performance model 230.

FIG. 14A shows an example of the configuration of the KPI performance model 230. In the KPI performance model 230, one KPI 223 and a plurality of performance items 232 considered to be linked with the KPI 223 may be associated with one another. The plurality of performance items 232 may have a hierarchical relationship. The KPI 223 may be a performance item corresponding to the KPI and the performance of the KPI may be collected by the performance monitoring program 12 as the performance data.

Figure 14B:
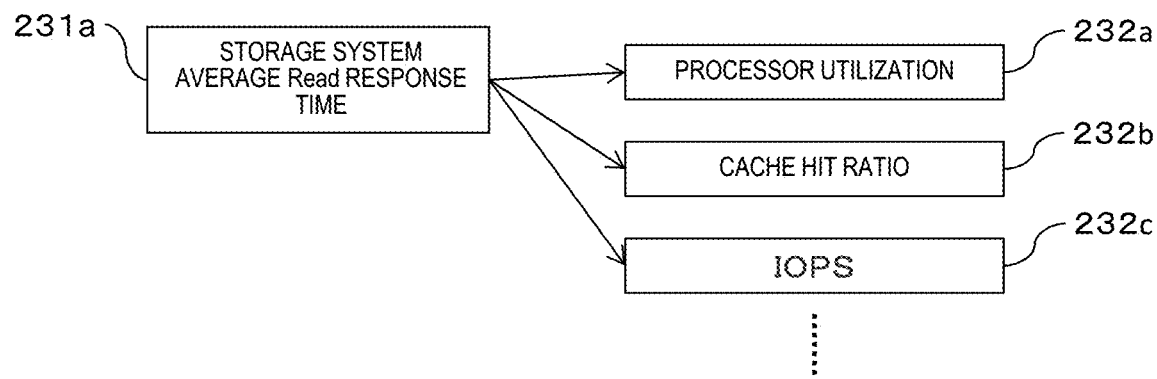
FIG. 14B is a diagram showing a specific example of the KPI performance model 230.

FIG. 14B shows a specific example of the KPI performance model 230. In FIG. 14B, performance items 232a, 232b, and 232c called "processor utilization" (processor utilization inside the storage), "cache hit ratio" (cache hit ratio in the same storage), and "IOPS" are associated with one another when "Read response time of storage" is set as KPI 223.

The performance degradation pattern classifier 250 calculates a pattern score indicating the similarity between the performance data to be analyzed and the existing performance degradation pattern. The performance degradation pattern classifier 250 may be, for example, a learned model generated by machine learning, and may be, for example, a cluster model generated by clustering.

The pattern score table 260 includes a pattern score calculated by the performance degradation pattern classifier 250.

FIG. 15 shows an example of the pattern score table 260.

As shown in the figure, the pattern score table 260 includes, as data items, a system 261, a KPI 262, a measurement time 263, a pattern ID 264 of a pattern classified by the performance degradation pattern classifier 250, and a pattern score 265. The pattern score 265 is calculated based on the measurement value 44 of the performance data table 40 in a pattern score calculation processing to be described later.

The performance degradation pattern table 270 includes information on a performance degradation pattern.

FIG. 16 shows an example of the performance degradation pattern table 270.

As shown in the figure, the performance degradation pattern table 270 includes, as data items, a system 271, a KPI 272, a pattern ID 273, a feature performance item 274, and a label 275. The feature performance item 274 is a performance item indicating a feature value in the performance degradation pattern specified by the pattern ID 273. The feature performance item 274 may include a plurality of performance items. The label 275 is identification information indicating the features of a pattern, and may be, for example, a character string that indicates a cause event causing the pattern.

For example, in the example of the figure, a pattern obtained for "average Read response time" as the KPI of the storage system is defined by "IOPS" and "cache hit ratio" in the feature performance item 274. Then, in this pattern, a character string called "Write processing conflict" is assigned as a label 275. "No Data" is stored in a pattern to which the label 275 is not assigned.

Figure 17:
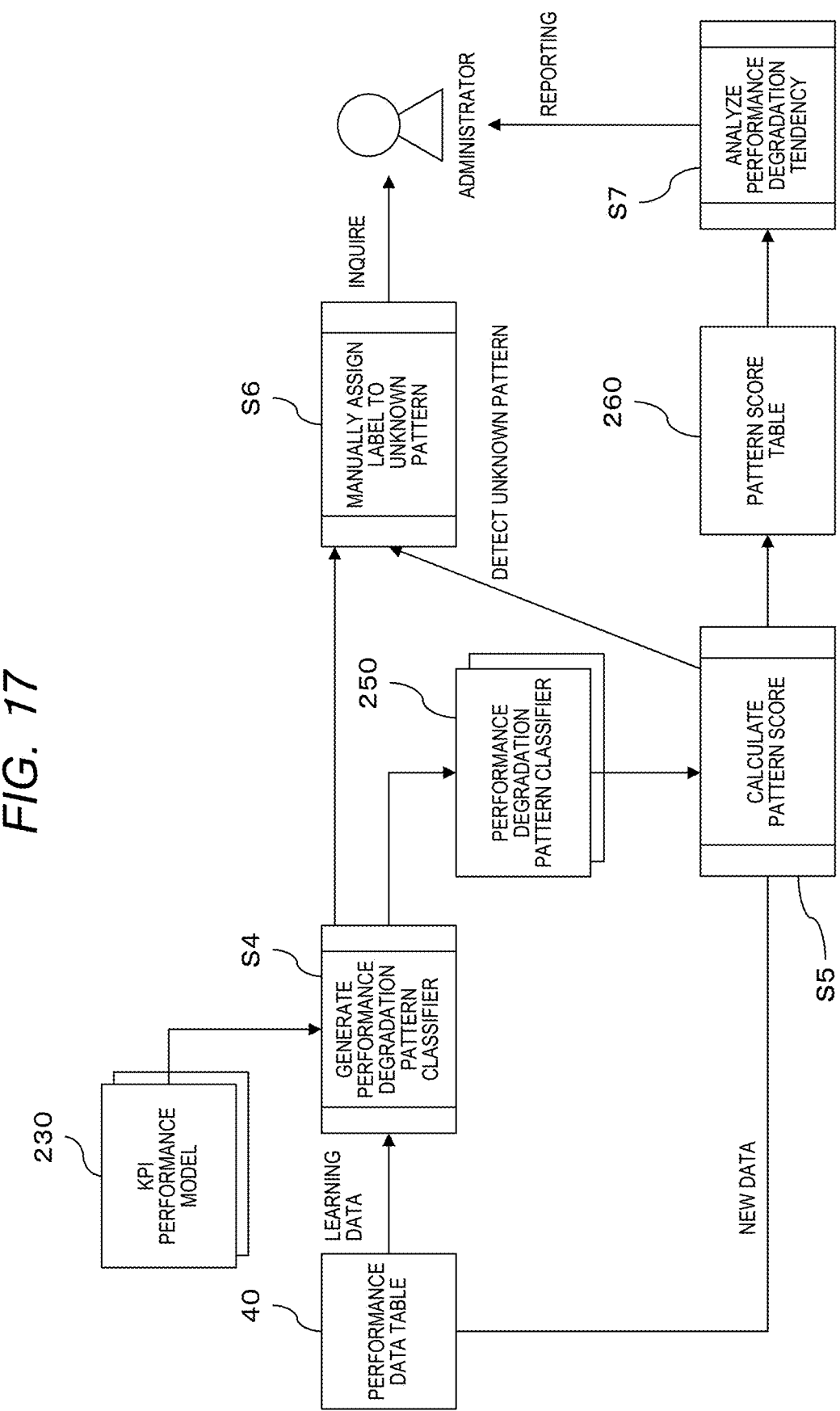
FIG. 17 is a flowchart of the processing outline of the first embodiment.

FIG. 17 shows an outline of the flow of processing performed by the performance analysis program 213. This figure shows the relationship between main processing steps S4 to S7 and their input/output data. Hereinafter, the operation of each step will be described.

First, the performance analysis program 213 generates the performance degradation pattern classifier 250 based on the KPI performance model 230 and the performance data stored in the performance data table 40 (S4). Herein, performance data obtained when KPI is degraded is used. In particular, performance data obtained when the degree of degradation is minor may be used. For example, the performance analysis program 213 may generate a performance degradation pattern classifier 250 having a performance degradation pattern composed of groups obtained by grouping performance data into a plurality of groups by a machine learning technique.

When an unknown pattern is filed here, the processing may proceed to step S6.

Next, the performance analysis program 213 calculates a pattern score of the performance data to be analyzed, using the performance degradation pattern classifier 250 generated in step S4 (S5). For example, the performance analysis program 213 computes a pattern score of each performance degradation pattern for each KPI 231 according to the performance degradation pattern classifier 250. The pattern score generated by the performance degradation pattern classifier 250 is stored in the pattern score table 260.

Here, when analysis target data is not similar to any existing patterns (for example, when the pattern score is larger (or smaller) than a predetermined threshold value) based on the pattern score calculated by the performance degradation pattern classifier 250, the processing proceeds to step S6.

The performance analysis program 213 displays an interface screen (see FIGS. 20 and 21) to be described later, on the display apparatus 6 (S6). On this screen, the administrator may assign a label indicating an event indicated by the unknown pattern, that is, a cause event in which the KPI is degraded.

The performance analysis program 213 analyzes the performance degradation tendency based on the data stored in the pattern score table 260 (S7). For example, the performance analysis program 213 statistically processes pattern scores for a certain period, and analyzes an occurrence frequency of a pattern or a change tendency (temporal change) of the pattern scores. When a tendency change is detected, the performance analysis program 213 may report the fact to the administrator.

Next, respective details of steps S4 to S7 as described above will be described.

Figure 18:
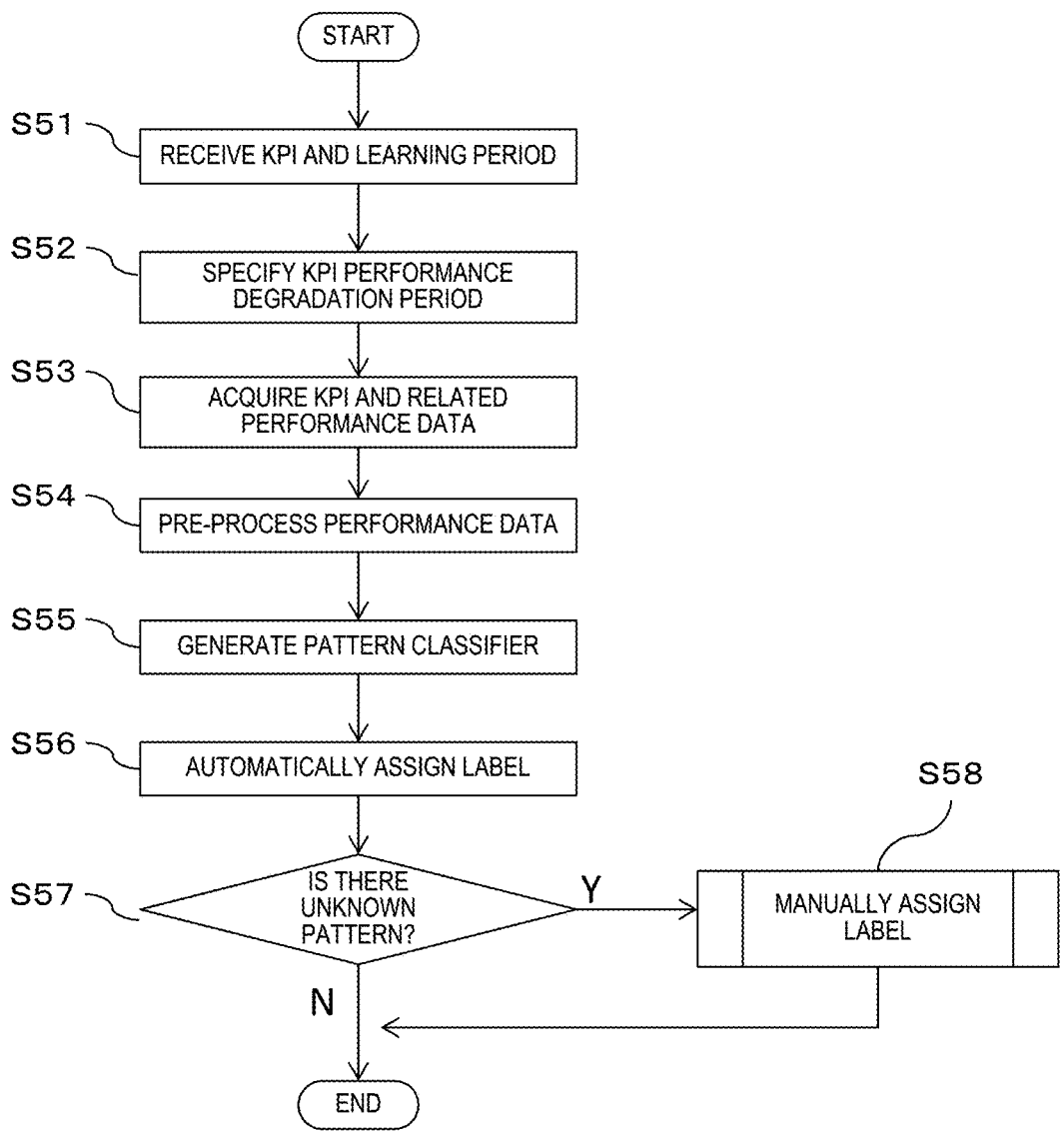
FIG. 18 is a flowchart of a pattern score calculation processing.

FIG. 18 shows detailed processing procedures of the generation processing of the performance degradation pattern classifier in step S4.

The performance analysis program 13 receives designation of a KPI and a learning period (S51). These may be designated, for example, by an administrator using an input device. The learning period may be a period in which at least a target KPI is degraded.

The performance analysis program 213 specifies a period in which the KPI is degraded (S52). For example, the performance analysis program 213 acquires performance data of the designated KPI from the performance data table 40, and may use a period indicating a value worse (degraded) than a predetermined reference, out of distribution of the values of the KPI within the designated learning period, as a performance degradation period of the KPI. The predetermined reference may be, for example, a value of the worst 5% out of the distribution of values of the KPI. The degradation period of the KPI may be specified by a method. For example, the degradation period of the KPI may be a period in which a deviation from the average value exceeds a predetermined threshold value.

The performance analysis program 213 specifies a performance item 232 associated with a KPI 231 designated by the KPI performance model 230. Further, the performance analysis program 213 acquires the measurement value 44 of the specified performance item 42 within the learning period from the performance data table 40 (S53). The performance analysis program 213 divides the performance data acquired here into a data group for the performance degradation period of the KPI designated in step S52 and another data group for a period in which the KPI in other periods is determined to be normal.

The performance analysis program 213 pre-processes the performance data acquired in step S53 (S54).

For example, the performance analysis program 213 normalizes the measurement value of the performance data for each performance item. There are various methods for normalization. For example, there is a method of obtaining an average value and standard deviation of data sets for each performance item, subtracting the average value from each data, and performing division by the standard deviation.

The performance analysis program 213 may calculate a correlation coefficient between the KPI and each related performance data. At this time, if there is a negative correlation, the correlation coefficient becomes a negative value less than zero. In the present embodiment, since the strength of the association is evaluated by the absolute value of the correlation coefficient, the sign is ignored. That is, in the case of the negative correlation, the correlation coefficient is multiplied by negative one to invert the sign. For example, in a case where the KPI is a "response time" and the related performance item is "cache hit ratio", in general, the "response time" increases as the "cache hit ratio" decreases, so that there is a negative correlation relationship therebetween. In this case, the measurement value of the "cache hit ratio" is multiplied by negative one to invert the sign so that there is a positive correlation relationship therebetween.

Further, the performance analysis program 213 may perform screening of the performance data. For example, the performance analysis program 213 may exclude performance items that are less than a predetermined threshold value from the normalized performance data, and may use only performance items to be processed, which are equal to or greater than a predetermined threshold value as follows. That is, performance items to be processed, whose contribution to degradation of the KPI is equal to or greater than a predetermined value, may be used.

The performance analysis program 213 generates the performance degradation pattern classifier 250 by machine learning based on the performance data pre-processed in step S54 (S55). Various generating algorithms of the performance degradation pattern classifier 250 may be adopted. For example, a generating algorithm may be regression analysis, clustering, neural networking, and the like, or a combination thereof. The clustering algorithm may be anything, for example, an algorithm such as K-means or X-means.

For example, an example in a case where cluster analysis is adopted as a generating algorithm of the performance degradation pattern classifier 250 will be described. For each KPI 231 defined in the KPI performance model 230, the performance analysis program 213 performs clustering of the measurement values 44 of n (n is one or more) performance items 232 associated with the KPI 231 as a data group. For example, the performance analysis program 213 treats the measurement values 44 of a plurality of performance items 232 related to one KPI 231 as n-dimensional vectors. Then, the performance analysis program 213 may generate clusters in the n-dimensional space indicating the normal range from the data group normally classified. The normal range may be represented by a single cluster or may be represented by a combination of a plurality of clusters. The performance analysis program 213 may generate a plurality of clusters indicating ranges of measurement values at the time of performance degradation based on the performance data of the KPI performance degradation period. These clusters may be generated for each factor of performance degradation. Each cluster is a group composed of measurement values having similar features, and is a performance degradation pattern. A distance between the n-dimensional vector of performance data composed of measurement values and each cluster indicates a similarity between the performance data and the cluster. For example, the distance between each vector and the cluster or a reciprocal of the distance may be used as the pattern score.

The performance analysis program 213 may refer to the performance degradation pattern table 270 and automatically assign a "label" to each pattern generated in step S55 (S56). For example, when a combination of a performance item affected when a cause event which is a certain system occurs and a KPI degraded by the performance item is known, the performance analysis program 213 may include combinations of these in advance. Then, the performance analysis program 213 may set the cause event on the label 275 if there is a match between a pattern of the generated cluster and a known combination. If there is no match between the pattern of the generated cluster and the known combination, the performance analysis program 213 sets "No Data" on the label 275. A "normal" label may be assigned to a cluster in the normal range.

The performance analysis program 213 refers to the performance degradation pattern table 270 and checks the presence or absence of an unknown pattern without a label (the label 275 is "No Data") (S57).

When there is no unknown pattern, the processing is ended as it is.

When there is an unknown pattern, the performance analysis program 213 displays information on the unknown pattern on the display apparatus 6, and the administrator manually assigns a label to the unknown pattern (S58). The administrator may input the character string of the label to be assigned to the unknown pattern using the input device. The performance analysis program 213 stores the input character string in the label 275 of the entry of the pattern.

In a case where the performance degradation pattern classifier 250 is generated for each KPI, the performance analysis program 213 may repeatedly perform the processing for each KPI.

Figure 19:
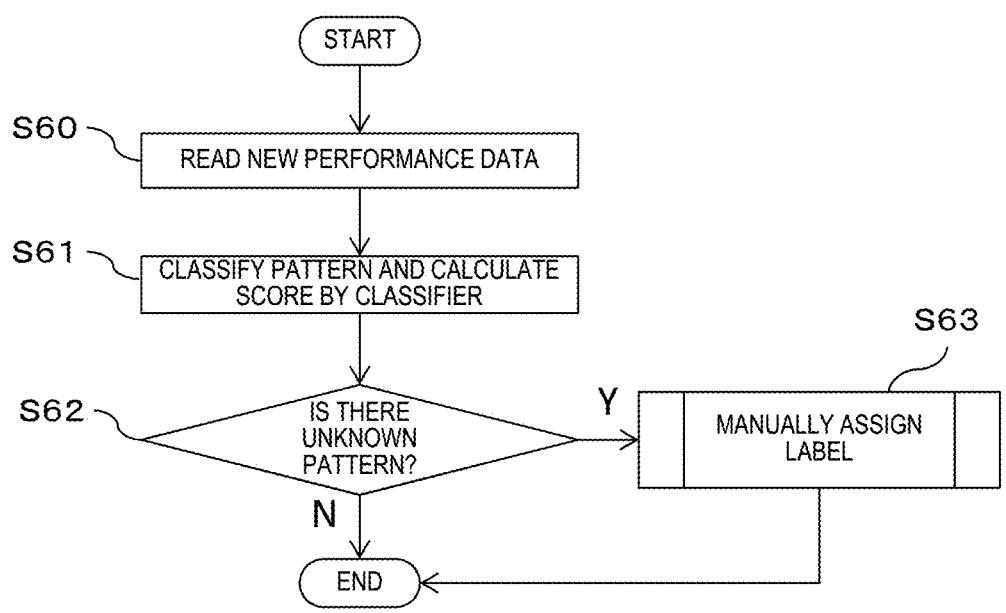
FIG. 19 is a flowchart of the generation processing of a performance degradation pattern classifier.

FIG. 19 shows detailed processing procedures of the pattern score calculation processing in step S5.

The performance analysis program 213 classifies the newly measured performance data into patterns using 250.

The performance analysis program 213 acquires performance data to be analyzed from the performance data table 40 (S60).

The performance analysis program 213 uses the performance degradation pattern classifier 250 to classify the performance data acquired in step S60 into existing patterns and calculates a pattern score (S61). The performance analysis program 13 stores the results in the pattern score table 260.

For example, the performance analysis program 213 performs the same pre-processing as in step S54 on the performance data acquired in step S60 and collects data at the same time as an n-dimensional vector. The performance analysis program 13 inputs the n-dimensional vector to the performance degradation pattern classifier 250. The performance degradation pattern classifier 250 calculates pattern scores related to a similarity between each n-dimensional vector and the existing patterns.

The performance analysis program 213 determines the presence or absence of an unknown pattern composed of data not similar to any existing patterns (S62). For example, the performance analysis program 213 may determine whether or not a new cluster different from any of the existing clusters has been generated.

If there is no unknown pattern, the processing is ended as it is.

When there is an unknown pattern, the administrator manually assigns a label by the same processing as step S58 in step S4 (S63).

As described above, the performance analysis program 13 may classify which pattern the new performance data corresponds to.

Next, manually assigning a label in steps S58 and S63 will be described in detail.

Figure 20:
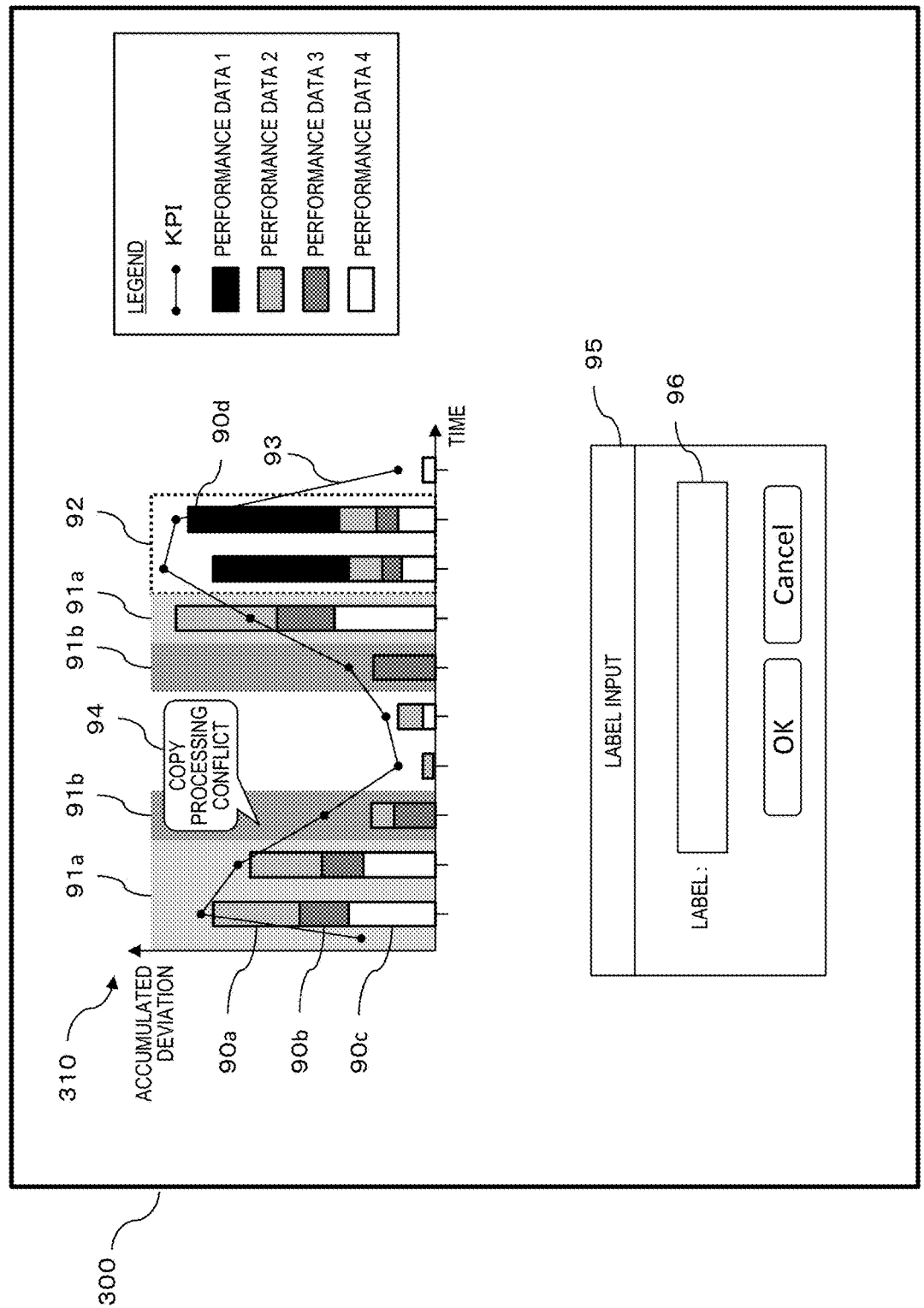
FIG. 20 is a diagram showing an example of a screen 300 displayed on a display apparatus.
Figure 21:
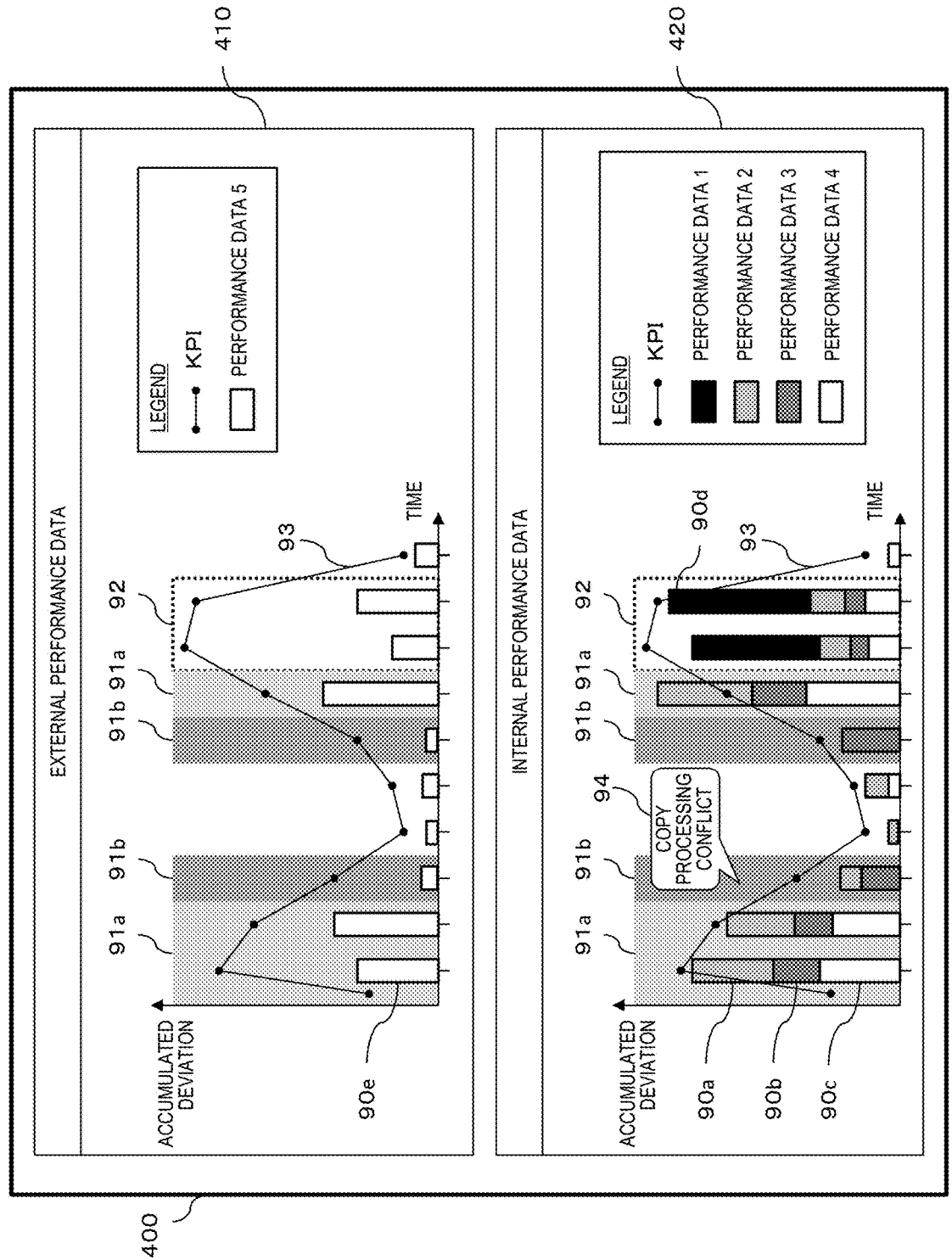
FIG. 21 is a diagram showing an example of a screen 400 displayed on a display apparatus.

First, an example of a GUI displayed on the display apparatus 6 is shown in FIGS. 20 and 21.

FIG. 20 shows an example of the screen 300 displayed on the display apparatus 6. The screen 300 is a screen for the performance analysis program 213 to receive information on the unknown pattern from the administrator.

The screen 300 includes a chart display area 310. The chart display area 310 includes a thin line 93 indicating the KPI, bar graph 90a to 90c indicating the performance data related to the KPI, and rectangles 91a and 91b indicating the pattern indicated by the performance data.

The thin line 93 indicates the KPI for each time.

The bar graph 90a to 90c show the degree of contribution to the degradation of the KPI of each related performance item, based on the performance data of a plurality of related performance items contributing to the degradation of the KPI. In the example of the figure, the bar graph 90a to 90c are one-dimensional graphs obtained by accumulating the values of the performance items at each time. The value of each performance data to be accumulated may be, for example, a value subjected to the pre-processing as described above. The length of the area of each performance item in the bar graph corresponds to the degree of contribution of each related performance item. By making such a display, the administrator may intuitively understand each performance degradation pattern.

The rectangles 91a and 91b are displayed as being superimposed on the bar graph as a background and indicate a pattern at each time. When an area of the rectangles 91a and 91b is selected, a label 94 corresponding to the pattern of the selected area may be displayed.

The chart display area 310 further includes a rectangle 92 indicating an unknown pattern. The administrator assigns a label to this unknown pattern. For example, when the rectangle 92 of the unknown pattern is selected, a pattern information input dialog 95 may be displayed. In this case, the administrator may input the contents of the occurred event at the point into a label input form 96, which are considered from the combination of the performance items of the bar graph 90. The information input to the form is stored in the label 275 of the performance degradation pattern table 270 by the performance analysis program 213.

FIG. 21 shows an example of another screen 400.

The screen 400 includes a plurality of chart display areas. That is, the screen 400 has an external performance data chart area 410 and an internal performance data chart area 420.

In the external performance data chart area 410, a chart related to the performance data corresponding to a workload amount assigned from the outside to the system is displayed. In the internal performance data chart area 420, performance data inside the system in the workload amount assigned from the outside is displayed. Since the external performance data chart and the internal performance data chart are separately displayed in this way, it helps the administrator to understand a causal relationship, thereby making it easy to consider the unknown pattern.

The performance data corresponding to the workload amount may be, for example, an I/O amount per second (IOPS) in the storage, the number of transactions per second in the database, SQL number per second, or the like. In this way, in order to distinguish the type of performance data (whether or not it is the workload amount), data structure indicating the type of performance data may be assigned to the performance items 32 and 232 of FIGS. 2 and 14.

Figure 22:
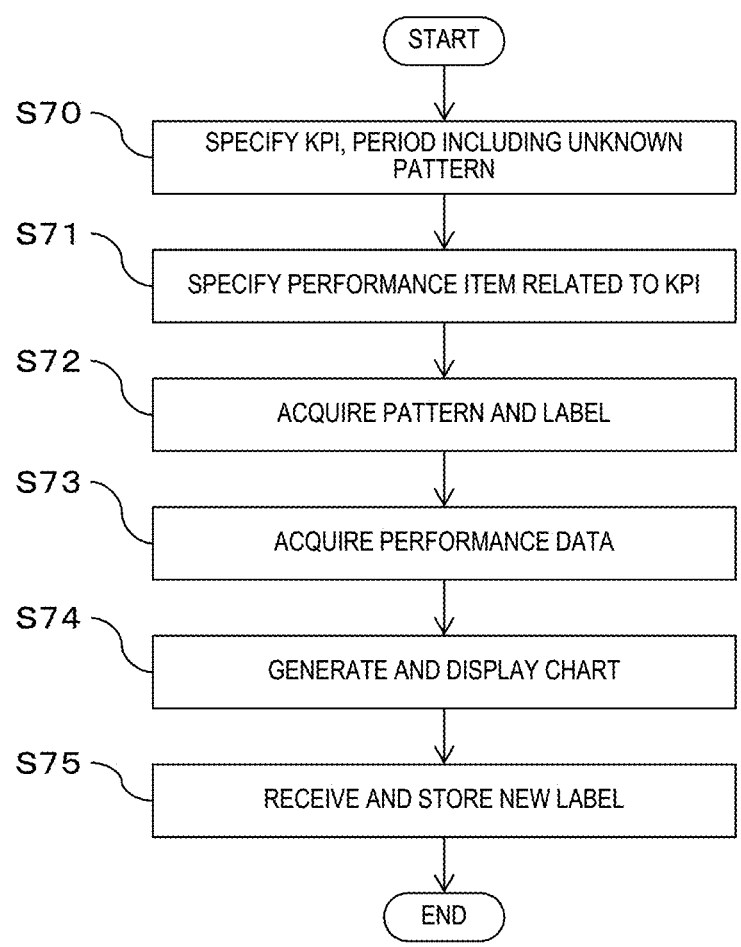
FIG. 22 is a flowchart of the display processing of a screen.

FIG. 22 is a flow of processing performed by the performance analysis program 213 related to the screens 300 and 400 of FIGS. 20 and 21, and is a detailed processing in step S58 of FIG. 16 and step S63 of FIG. 17.

When an unknown pattern occurs, the performance analysis program 213 specifies a certain period including the unknown pattern and the KPI corresponding to the unknown pattern (S70).

The performance analysis program 213 refers to the KPI performance model 230 and specifies the performance item 232 related to the specified KPI 231 (S71).

The performance analysis program 213 refers to the performance degradation pattern table 270 and the pattern score table 260 and acquires a pattern and a label 275 of the pattern corresponding to the KPI and the period specified in step S70 (S72).

The performance analysis program 213 acquires, from the performance data table 40, the measurement value 44 at each time of the performance item specified in step S71 (S73).

The performance analysis program 213 generates a chart based on the measurement values acquired in step S73, and causes the display apparatus 6 to display the chart (S74). For example, the performance analysis program 213 may generate a chart based on the performance data subjected to the same pre-processing as in step S54.

The performance analysis program 213 receives the new label input by the administrator on the screens 300 and 400 and stores the new label in a label 275 of the performance degradation pattern table 270 (S75).

Figure 23:
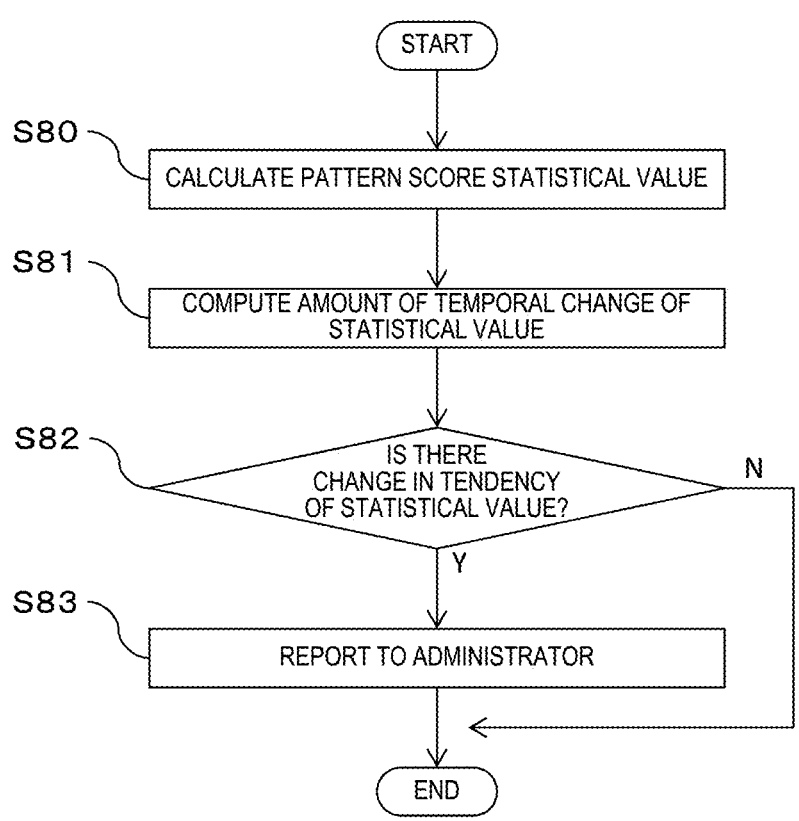
FIG. 23 is a flowchart of the analysis processing of a temporal change tendency of the pattern score.

Next, details of step S7 will be described with reference to FIG. 23.

In step S7, the tendency of the temporal change of the pattern score calculated in step S5 is analyzed, and signs of KPI degradation are detected. Hereinafter, each step will be described.

The performance analysis program 213 statistically processes pattern scores 265 stored in the pattern score table 260 to calculate a pattern score statistical value (S80). For example, when the pattern score 265 is a distance from the cluster of patterns, as the pattern score 265 becomes smaller, there is a similarity to the pattern, and as the pattern score 265 becomes larger, there is a dissimilarity. Therefore, the performance analysis program 213 may count the number of rows in which the value of the pattern score 265 is larger than a predetermined value for each pattern ID 264, and may use this number as the statistical value.

The performance analysis program 213 computes an amount of the temporal change of the pattern score statistical value calculated in step S80 (S81). The amount of the temporal change may be, for example, a difference value between adjacent periods of statistical values calculated for each certain period.

The performance analysis program 213 determines the presence or absence of a tendency change, based on the amount of the temporal change of the statistical value of the pattern scores obtained in step S81 (S82). The determination of the presence or absence of a tendency change may be performed, for example, based on whether or not the amount of the temporal change exceeds a predetermined threshold value.

When no tendency change is recognized, the processing skips step S83 and is ended.

When a tendency change is recognized, the performance analysis program 213 may report the KPI and the period, in which the tendency change was observed, to the administrator by means of e-mail, screen display or the like (S83).

As a result, it is possible to detect degradation of the KPI or signs of the degradation as soon as possible. The administrator who receives this report may take actions for resolving or preventing the cause event before the performance of the system degrades drastically.

REFERENCE SIGNS LIST

1: management computer, 12: performance monitoring program, 13: performance analysis program, 30: performance degradation cause model, 40: performance data table, 50: outlier score calculator, 60: outlier score history table, 70: outlier score aggregation table, 80: batch outlier score aggregation table, 90: job execution history, 213: performance analysis program, 230: KPI performance model, 250: performance degradation pattern classifier, 260: pattern score table, 270: performance degradation pattern table.

The invention claimed is:

1. A monitoring apparatus for monitoring a computer system, comprising:
   at least one hardware processor; and
   a software program that is configured to, when executed by the at least one hardware processor,
      collect performance data on a plurality of performance items related to performance of the computer system,
      access at least one performance degradation cause model that associates each of a plurality of cause events with degradation performance items that are degraded by the cause event,
      access a job execution history that comprises, for each of a plurality of jobs executed by the computer system, a type of the job and an execution period of the job,
      during a machine-learning period, use a portion of the performance data that represents normal behavior of the computer system to train a machine-learning model to output an outlier score that represents a degree of deviation of performance data of the degradation performance items from a normal range,
      after the machine-learning period, apply the machine-learning model to target performance data of the degradation performance items to produce an outlier score for each of a plurality of cause events for each type of job and each execution period over a time period, and
      output information on each of the plurality of cause events based on a temporal change in the produced outlier scores over the time period.

2. The monitoring apparatus for monitoring a computer system according to claim 1, wherein at least one performance degradation cause model comprises a plurality of performance degradation cause models for a plurality of cause events, wherein the machine-learning model is applied to target performance data of the degradation performance items associated with each of the plurality of cause events, for each of the plurality of jobs, to produce an outlier score for each of the plurality of cause events and each of the plurality of jobs over the time period.

3. The monitoring apparatus for monitoring a computer system according to claim 1, wherein the software program is further configured to, for each of the plurality of jobs, select the cause event based on the temporal change that most closely matches a change in the execution period of the job.

4. A monitoring apparatus for monitoring a computer system, the monitoring apparatus comprising:
at least one hardware processor; and
a software program that is configured to, when executed by the at least one hardware processor,
collect performance data on a plurality of performance items related to performance of the computer system,
during a machine-learning period, use a portion of the performance data that represents degraded performance of the computer system to train a machine-learning classifier to output a pattern score that represents a similarity to at least one reference pattern of performance items associated with degradation of an evaluation index;
after the machine-learning period, apply the machine-learning classifier to target performance data to produce one or more pattern scores for the target performance data, and determine a reference pattern that is most similar to the target performance data based on the produced one or more pattern scores, and
output a label associated with the reference pattern that is determined to be most similar to the target performance data.

5. The monitoring apparatus for monitoring a computer system according to claim 4, wherein the software program is further configured to output information indicating a degree of contribution to the degradation of the evaluation index of each associated performance item, based on the target performance data.

6. The monitoring apparatus for monitoring a computer system according to claim 5, wherein the information indicating a degree of contribution comprises a one-dimensional graph in which each degree of contribution of each associated performance item is indicated by a length.

7. The monitoring apparatus for monitoring a computer system according to claim 6, wherein the one-dimensional graph only comprises a degree of contribution of each associated performance item whose contribution is larger than a predetermined value.

8. The monitoring apparatus for monitoring a computer system according to claim 4, wherein the software program is configured to, when no reference pattern is similar to the target performance data, output information indicating a degree of contribution to degradation of the evaluation index of each associated performance item, based on the target performance data, and output a screen for accepting input of a label to be assigned to a new reference pattern representing the target performance data.

9. The monitoring apparatus for monitoring a computer system according to claim 4, wherein the software program is further configured to:
generate a plurality of reference patterns by grouping values of performance items in the portion of the performance data that represents degraded performance of the computer system based on features; and
assign a label to each of the plurality of reference patterns based on the features.

10. A method for monitoring a computer system, the method comprising:
collecting performance data on a plurality of performance items related to performance of the computer system;
accessing at least one performance degradation cause model that associates each of a plurality of cause events with degradation performance items that are degraded by the cause event;
accessing a job execution history that comprises, for each of a plurality of jobs executed by the computer system, a type of the job and an execution period of the job, during a machine-learning period, using a portion of the performance data that represents normal behavior of the computer system to train a machine-learning model to output an outlier score that represents a degree of deviation of performance data of the degradation performance items from a normal range;
after the machine-learning period, applying the machine-learning model to target performance data of the degradation performance items to produce an outlier score for each of a plurality of cause events for each type of job and each execution period over a time period; and
outputting information on each of the plurality of cause events based on a temporal change in the produced outlier scores over the time period.

* * * * *